June 1, 1965 MUTSUMI MISAWA 3,187,340
MOTION PICTURE CAMERA
Filed Oct. 24, 1960 3 Sheets-Sheet 1

INVENTOR.
Mutsumi Misawa
BY Michael S. Striker
Attorney

June 1, 1965  MUTSUMI MISAWA  3,187,340
MOTION PICTURE CAMERA

Filed Oct. 24, 1960

INVENTOR.
Mutsumi Misawa
BY Michael S. Striker
Attorney

June 1, 1965  MUTSUMI MISAWA  3,187,340
MOTION PICTURE CAMERA

Filed Oct. 24, 1960  3 Sheets-Sheet 3

INVENTOR.
Mutsumi Misawa
BY
Michael S. Striker
Attorney

United States Patent Office 3,187,340
Patented June 1, 1965

3,187,340
MOTION PICTURE CAMERA
Mutsumi Misawa, Tokyo, Japan, assignor to Seiko Denki
Kogyo Kabushiki Kaisha, Tokyo, Japan
Filed Oct. 24, 1960, Ser. No. 64,601
1 Claim. (Cl. 352—165)

The present invention relates to cameras.

More particularly, the present invention relates to motion picture cameras.

One of the objects of the present invention is to provide a motion picture camera which is of quite a small size of a simple rectangular configuration, the camera of the invention having the general configuration of a book and having approximately the same size as an average book.

Another object of the present invention is to provide a motion picture camera of this type with a structure in its interior which separates the mechanism of the camera from the magazine where the film spools are located and which at the same time permits all of the structure to be advantageously arranged even though the camera is quite small in size.

A further object of the present invention is to provide a camera with an extremely compact arrangement of the various mechanisms necessary to operate the camera.

An additional object of the present invention is to provide a camera of the above type with a manual control structure which is exceedingly simple and very easy to operate.

Still another object of the present invention is to provide a motion picture camera with an exceedingly simple and compact assembly of the shutter, claw, and spool driving structures.

The object of the present invention also includes the provision of an exceedingly simple claw arrangement for the stepwise advancing of the film.

Also, the object of the present invention includes the provision of structure capable of accomplishing all of the above objects and at the same time composed of simple rugged elements which are very reliable in operation.

Still another object of the present invention is to provide a camera of the above type which has its housing provided with removable parts giving access not only to the magazine but also to the mechanism of the structure which operates the camera.

With the above objects in view the invention includes, in a motion picture camera, a housing of generally rectangular configuration and a stepped partition in the housing dividing the interior thereof into a magazine chamber and a mechanism chamber separate from the magazine chamber. Because of the stepped configuration of this partition it is possible in accordance with the present invention to provide an extremely compact arrangement of all of the elements while retaining the relatively small dimensions of the camera. This stepped partition has a transverse wall portion normal to the optical axis and formed with a film gate, and in front of this transverse portion is located the rotary shutter means of the invention which is driven directly from a motor. Between the rotary shutter means and the transverse wall portion of the partition is located a claw means of the invention, and this claw means is actuated by an eccentric cam fixed to the shutter means at a rear surface thereof which is directed toward the transverse wall of the partition. The shutter means includes a rotary shaft which serves to drive a gear train carried by the partition and serving to drive the tape-up spool which is in the magazine chamber. Furthermore, the face of the rotary shutter which is directed away from the transverse wall of the partition and toward the front wall of the camera carries a cam provided with a notch which is adapted to receive a projection of a manually operable lever means of the invention which is urged by a spring to a position where this projection is located in the notch so as to hold the shutter in a predetermined rest position. When this manually operable lever means of the invention is actuated by the operator so as to move the projection out of the notch the shutter is released for operation and at the same time this movement of the manually operable lever means closes an electrical switch which energizes an electrical motor which drives the shutter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
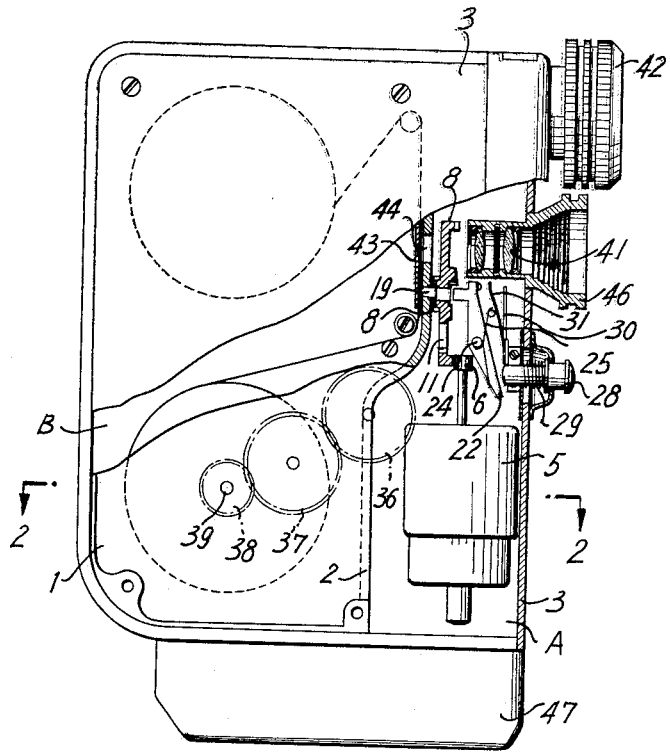
FIG. 1 is a partly sectional side elevation of a camera constructed according to the present invention.
Figure 2:
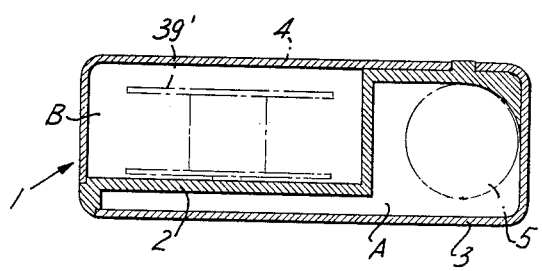
FIG. 2 is a sectional plan view taken along line 2—2 of FIG. 1 in the direction of the arrow.

Referring now to the drawings, the structure of the housing of the motion picture camera of the invention and the partition in the interior thereof is shown most clearly in FIGS. 1 and 2. Thus, it will be seen that the motion picture camera is provided with a housing 1 of a generally rectangular configuration. This housing 1 has narrow front and rear walls, as is apparent from FIG. 2, and a pair of opposed side walls extending between the front and rear walls, and of course the housing has top and bottom walls. Within this generally rectangular housing, which has the general shape and size of a book, is located a partition 2 which, in accordance with the present invention, is stepped, in the manner shown in FIG. 2. Thus, the partition 2 has a front side wall portion engaging directly a side wall of the housing 1, and a rear side wall portion which is spaced from and parallel to the opposite side wall portion of the housing 1, this rear part of the partition 2 extending all the way up to the rear wall of the housing 1. Between its front and rear side portions the partition 2 has a transverse portion in a plane normal to the optical axis, as is apparent from FIG. 2, and it is this transverse portion which is formed with the film gate 44 shown in FIGS. 1 and 4. The partition 2 divides the interior of the housing 1 into a mechanism chamber A and a magazine chamber B, and these chambers are maintained separate from each other by the partition 2. The rear wall of the housing 1 together with part of the side wall which encloses the magazine chamber B forms an angular wall unit 4 which is removable from the partition 2 and capable of being releasably fastened thereto in a suitable way, so that by removing the wall 4 access may be had to the magazine chamber B for introducing and removing film therefrom. In the same way, the housing is provided with a front wall portion and a side wall portion defining part of the mechanism chamber A, and this also forms an angular wall unit 3 capable of being removed upon removal of screws some of which are visible in FIG. 1, so that in this way access may be had when necessary to the mechanism chamber A.

To the bottom wall of the housing 1 is fixed an enclosure 47 for a battery suuch as a dry-cell battery which is removable from the compartment 47 in any suitable way not forming part of the present invention and which is connected electrically with an electric motor 5 also in a well-known manner not forming part of the present invention. This electric motor 5 is located in a lower part of the chamber A adjacent the front wall of the camera housing and is carried by the front portion of the partition 2, as is evident from FIG. 2. The electrical motor 5 is a constant speed D.C. motor which is driven from the battery at a constant speed and which serves to drive all of the moving parts of the camera. Thus, as is apparent from FIGS. 1 and 7, the motor 5 has its drive shaft fixed directly to a pinion 6 which thus is directly driven by the motor 5.

Figure 7:
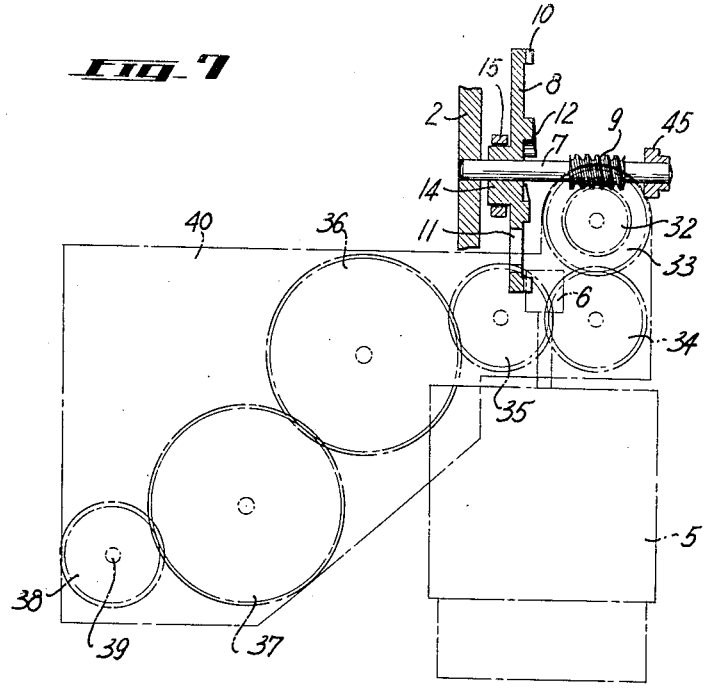
FIG. 7 is a partly diagrammatic illustration of the gear train which serves to transmit the drive to the take-up spool of the magazine.
Figure 8:
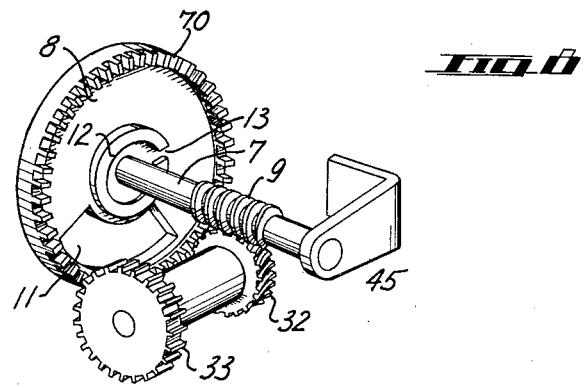
FIG. 8 is a perspective view on an enlarged scale of the structure which drives the gear train from the rotary shutter means of the invention.

This pinion 6 serves to drive the rotary shutter means of the invention. This rotary shutter means of the invention includes the shaft 7 which is shown in FIGS. 7 and 8. The shaft 7 extends parallel to the optical axis but is located at an elevation lower than the optical axis. The rear end of the shaft 7 is supported directly by an opening in the transverse portion of the partition 2, so that the latter forms one bearing for the shaft 7, and the front end of the shaft 7 is supported for rotation by a bearing formed by part of a bracket 45 which is fixed to the front wall of the camera. The rotary shaft 7 fixedly carries the disc 8 which forms the shutter disc of the invention, and it will be noted that the shaft 7 is provided with a worm 9 which rotates with the shaft 7 for a purpose described below. The shutter disc 8 if formed at its front face with the gear teeth 10 which are directed toward the front of the camera, so that the shutter disc 8 also forms a ring gear, and the pinion 6 meshes directly with the gear 10 so as to directly rotate the shutter disc 8. The shutter disc 8 is formed with an arcuate aperture 11 which forms the cutout through which the film is exposed when this aperture 11 is aligned with the film gate 44 formed in the transverse portion of the partition 2.

At its front face which is directed toward the front wall of the camera the shutter disc 8 fixedly carries a cam 12 which may be integral with the shutter disc 8, and this cam 12 has a front face of a helical configuration, as is apparent particularly from FIGS. 1, 7, and 8. The helical cam 12 is interrupted by a notch 13.

Figure 4:
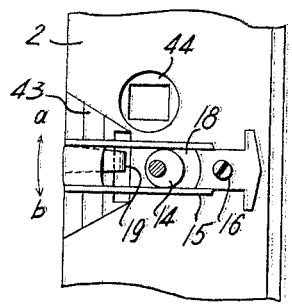
FIG. 4 shows a transverse portion of a partition of the invention as seen when viewing the front face of this transverse portion, FIG. 4 illustrating the film gate as well as the claw means of the invention.

At its rear face which is directed toward the transverse portion of the partition 2 the shutter disc 8 fixedly carries a cam 14 which may be integral with the disc 8 and which is in the form of an eccentric cam, as is particularly apparent from FIG. 4. This cam 14 rotates with the disc 8, the latter being fixed to the shaft 7, as was pointed out above, so that through the disc 8 the shaft 7 is driven from the motor 5.

The eccentric cam 14 forms the cam of the claw means of the invention and actuates this claw means. The structure of the claw means is most clearly shown in FIGS. 4–6. Thus, the claw means includes an elongated member 15 having upper and lower flanges between which the cam 14 is located. A pivot pin in the form of a screw 16 is threadedly carried by the transverse portion of the partition 2, and this pivot pin 16 is located adjacent the right end of the elongated member 15, as viewed in FIGS. 4 and 6. A spring 17 is located between the head of the screw 16 and the elongated member 15 so as to urge the latter at its right end portion, as viewed in FIGS. 4 and 6, toward the transverse portion of the partition 2, and the opening of the member 15 through which the pivot pin 16 passes has sufficient clearance with respect to the pivot pin so that the left end portion of the member 15, as viewed in FIGS. 4 and 6, can have a limited degree of turning movement toward and away from the front wall of the camera.

Figure 5:
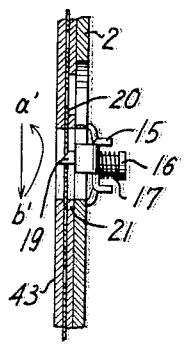
FIG. 5 is a longitudinal section adjacent the left edge of FIG. 4 and extending vertically, FIG. 5 illustrating the manner in which a tooth of the claw means cooperates with the film to advance the latter.
Figure 6:
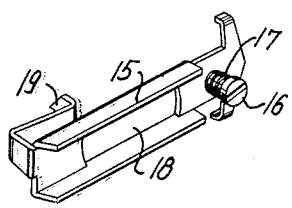
FIG. 6 is a perspective illustration of an elongated member of the claw means of the invention.

Between its upper and lower flanges the elongated member 15 is formed with a cutout 18 which receives the cam 14. At its left end portion, as viewed in FIGS. 4 and 6, the elongated member 15 of the claw means of the invention is provided with the springy claw tooth 19, this tooth 19 being formed by an extension of the member 15 which is bent first toward the rear of the camera then in a direction parallel to the flanges of the member 15 and terminates finally in a rearwardly directed portion which has an end face directed downwardly toward the rear of the camera, as is clearly apparent from FIG. 5. The transverse portion of the partition 2 is formed beneath the film gate 44 and to one side thereof with a cutout through which the claw tooth 19 passes, as is shown most clearly in FIG. 4, and during rotation of the cam 14 with the shutter means the left end portion of the claw means will reciprocate in the manner indicated by the arrow a–b of FIG. 4. The apertures along the side of the film strip are aligned with the tooth 19, and as is apparent from FIG. 5 when this tooth 19 is in one aperture and moves in a downward direction as indicated by the arrow a'–b' of FIG. 5, the film will be advanced downwardly. On the other hand, due to the inclination of the rear end face of the tooth 19, when the claw is reciprocated upwardly by the cam 14 the tooth 19 will ride out of the aperture of the film and will move along the film to the next higher aperture and snap into the next higher aperture so that during the next downward movement of the claw the film will again be advanced by a distance equal to one film frame. The manner in which the tooth 19 moves out of one aperture up into the next aperture of the film is shown by the upwardly directed curved arrow b'–a' in FIG. 5. As is apparent from FIG. 5, the film gate is actually formed in a separate plate which is fixed to the rear face of the transverse portion of the partition 2, and the film 20 is shown in FIG. 5 engaging the plate which is formed with the film gate. A conventional pressure plate 43 maintains the film in the focal plane, and FIG. 5 shows the apertures 21 of the film which are adapted to be successively engaged by the tooth 19 of the claw means of the invention for advancing the film in a step-wise fashion in the manner described above.

Figure 3:
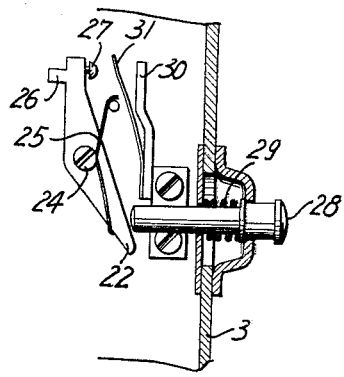
FIG. 3 illustrates a manually operable lever means of the invention on an enlarged scale as compared to FIG. 1.

A manually operable lever means is provided for stopping and starting the operation of the camera, and this manually operable lever means includes the lever 22 shown in FIGS. 1 and 3. This lever 22 is pivotally supported by a screw member 24 which is threaded into the forward portion of the partition 2, and a spring 25, in the form of a wire spring, is coiled about the pivot pin 24, engages with one end against a lower portion of the lever 22, and engages with its upper end a stationary pin carried by the partition 2, so that the spring 25 urges the lever 22 to turn in a counterclockwise direction, as viewed in FIG. 3. Thus, the spring 25 will urge the projection 26 of the lever 22 in a rearward direction. When the camera does not operate the projection 26 is located in the notch 13 of the cam 12, and as is apparent from FIG. 8 the aperture 11 of the shutter disc 8 is at this time located at the lowest portion of the shutter disc while the film gate 44 is aligned with an upper portion of the shutter disc (FIG. 1), so that at this time the film gate is closed and the film cannot be exposed to light. The upper portion of the lever 22 also carries an electrical contact 27 which is insulated from the remainder of the lever 22 and which is connected into the circuit of the motor 5 and the battery in the compartment 47 so as to close this circuit in the manner described below.

The manually operable lever means includes in addition a manually-engageable member 28 in the form of a plunger accessible at the front of the camera and urged forwardly by a spring 29, as indicated in FIG. 3. When the manually engageable member 28 is pushed inwardly toward the rear by the operator, the left end of the member 28, as viewed in FIG. 3, will engage the lever 22 to turn the latter in a clockwise direction in opposition to the spring 25, and in this way the projection 26 will be moved out of the notch 13 so as to free the shutter disc 8 for rotation. A springy electrical contact 31 is located in the path of movement of the contact 27 to be engaged thereby, and these contacts 27 and 31 form a switch which is automatically closed upon turning of the manually operable lever means 22 in a clockwise direction, by the operator, as viewed in FIG. 3, and when this switch 27, 31 is closed the motor 5 is energized. The electrical contact 31 is carried by a bracket 30 which serves the additional purpose of grounding the contact 31. Thus, when the plunger 28 is actuated by the operator the shutter will be released for rotation and the electrical motor will be energized so as to rotate the shutter.

As was pointed out above, the shaft 7 of the rotary shutter means of the invention rotates with the disc 8, and this shaft 7 carries the worm 9 from which the drive is taken for turning the take-up spool 39' indicated diagrammatically in FIG. 2. Referring to FIG. 7, a wall 40 having the configuration shown in dot-dash lines in FIG. 7 is fixed to the rear side portion of the partition 2 in the space between the partition 2 and the side wall of the housing which appears at the lower part of FIG. 2, and this wall 40 extends forwardly beyond the transverse portion of the partition 2, as is apparent from FIG. 7. This forward portion of the wall 40 is formed with an opening which serves as a bearing for a shaft which extends through this opening and which is fixed at one end to a worm wheel 32 and at its opposite end to a gear 33, the elements 32 and 33 being located on opposite sides of the wall 40 at the upper right portion thereof, as viewed in FIG. 7. The worm wheel 32 meshes with the worm 9 so that when the shaft 7 turns the worm wheel 32 will turn and will thus rotate the gear 33 which is located between the wall 40 and the side wall of the camera which appears at the lower part of FIG. 2. This gear 33 meshes with a train of gears shown in FIG. 7 and all rotatably carried by the wall 40, the gear 33 being the first of the train of gears and meshing with the gear 34 which transmits the drive through the gears 35–38, the gear 38 being the last gear of the gear train, and all of these gears are located in the space between the rear portion of the partition 2 and the side wall of the housing 1 which appears at the lower part of FIG. 2. The last gear 38 of the gear train is fixed to the shaft 39 which not only is rotatably supported by the wall 40 but in addition passes through an opening of the partition 2 into the magazine chamber B where the shaft 39 is provided with a conventional support for the take-up spool 39' so as to drive the latter.

The film is threaded in a conventional manner in the magazine chamber B from the supply spool which is shown diagrammatically at the upper left portion of FIG. 1 over suitable guides between the pressure plate 43 and the film gate 44 and back to the take-up spool 39'.

FIG. 1 shows the objective 41 which of course has its axis aligned with the filmgate 44 and when the aperture 11 of the shutter disc 8 is between the gate 44 and the objective 41 an exposure will be made. The lenses of the objective are located in a suitable tube 46, and the camera housing is provided with a viewfinder through which the subject is viewed when operating the camera. Also, the camera is provided with an exposure meter 42 which in a well-known manner automatically actuates a diaphragm extending into the lens tube 46 so as to control the exposure aperture automatically, and any suitable well-known adjustment is provided for the exposure meter so as to introduce into the camera the speed of the film which is used.

The operation of the camera described above is believed to be evident. When the aperator depresses the button 28 the motor 5 will be energized so as to rotate the shutter which of course has been released in the manner described above, and from the rotating shutter the claw means will be actuated as well as the gear train which drives the take-up spool. The angular position of the cam 14 with respect to the aperture 11 of the shutter disc 8 is such that when this aperture 11 is aligned with the film gate 44 the claw tooth 19 is moving upwardly toward the next upper perforation of the film and the film is stationary, so that the film remains stationary during the making of an exposure. When the film has a perforation engaged by the tooth 19 of the claw means and when the latter moves down so as to advance the film the aperture 11 is out of line with the film gate 44 so that no exposure of the film can take place during advancing of the film.

In order to stop the camera the operator simply releases the button 28 which is moved to the right by the spring 29, and the spring 25 urges the projection 26 against the helical cam 12 so that as soon as the notch 13 reaches the projection 26 the latter will snap into the notch 13 and terminate the operations.

It will be understood that each of the elements described above, or two or more together, may also find a useful application in other types of cameras differing from the types described above.

While the invention has been illustrated and described as embodied in motion picture cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed as new and desired to be secured by Letters Patent is:

In a motion picture camera, in combination, a housing having front and rear walls and a pair of opposed side walls; a partition in said housing dividing the interior thereof into a magazine chamber and a mechanism chamber, said partition having a transverse portion located substantially in a plane normal to the optical axis between and spaced from said front and rear camera walls and said partition having a side portion extending from said transverse portion to the rear wall of said housing in the interior of the latter and spaced from and extending substantially parallel to one of said side walls of said housing; rotary shutter means located between said front wall of said camera housing and said transverse portion of said partition and including a shaft parallel to the optical axis and extending between said transverse portion of said partition and said front wall of said camera housing; drive means cooperating with said rotary shutter means for rotating the latter; a worm carried by said shaft for rotation therewith; a worm wheel meshing with said worm to be rotated thereby; a first gear fixed coaxially to said worm wheel for rotation therewith; a train of gears supported for rotation by said side portion of said partition and located between said side portion of said partition and said one side wall of said camera housing, said train of gears including a gear which meshes with said first gear and said train of gears terminating in a last gear; a shaft connected to said last gear for rotation therewith and extending through said side portion of said partition into said magazine chamber to rotate in the latter, whereby a take-up spool in said magazine chamber may be driven from said shaft which is connected to said last gear for rotation therewith.

References Cited by the Examiner
UNITED STATES PATENTS

| | | | |
|---|---|---|---|
| 579,882 | 3/97 | Lumiere | 8—18.4 |
| 2,013,288 | 9/35 | Porter | 88—16 |
| 2,126,299 | 8/38 | Wittel et al. | 242—55.13 |
| 2,135,026 | 11/38 | Becker | 352—72 |
| 2,153,142 | 4/39 | Fairbanks | 88—18.4 |
| 2,153,220 | 4/39 | Wittel et al. | 352—74 |
| 2,165,362 | 7/39 | Fairbanks et al. | 352—166 |
| 2,183,522 | 12/39 | Wittel et al. | 352—124 |
| 2,187,356 | 1/40 | Malek | 352—242 |
| 2,201,886 | 5/40 | Dalotel | 352—77 |
| 2,213,768 | 9/40 | Merriman | 242—55.13 |
| 2,305,813 | 12/42 | Ruhnau | 352—231 |
| 2,453,301 | 11/48 | Brown et al. | 88—17 |
| 2,462,302 | 2/49 | Bolsey | 88—17 |
| 2,541,796 | 2/51 | Von Voss | 88—16 |
| 2,735,332 | 2/56 | Mihalyi | 88—16 |
| 2,928,315 | 3/60 | Broido | 88—17 |
| 3,017,803 | 1/62 | Sakaki | 352—176 |
| 3,062,091 | 11/62 | Akahane | 88—16 |

NORTON ANSHER, *Primary Examiner.*

EMIL G. ANDERSON, G. Y. CUSTER, *Examiners.*